UNITED STATES PATENT OFFICE.

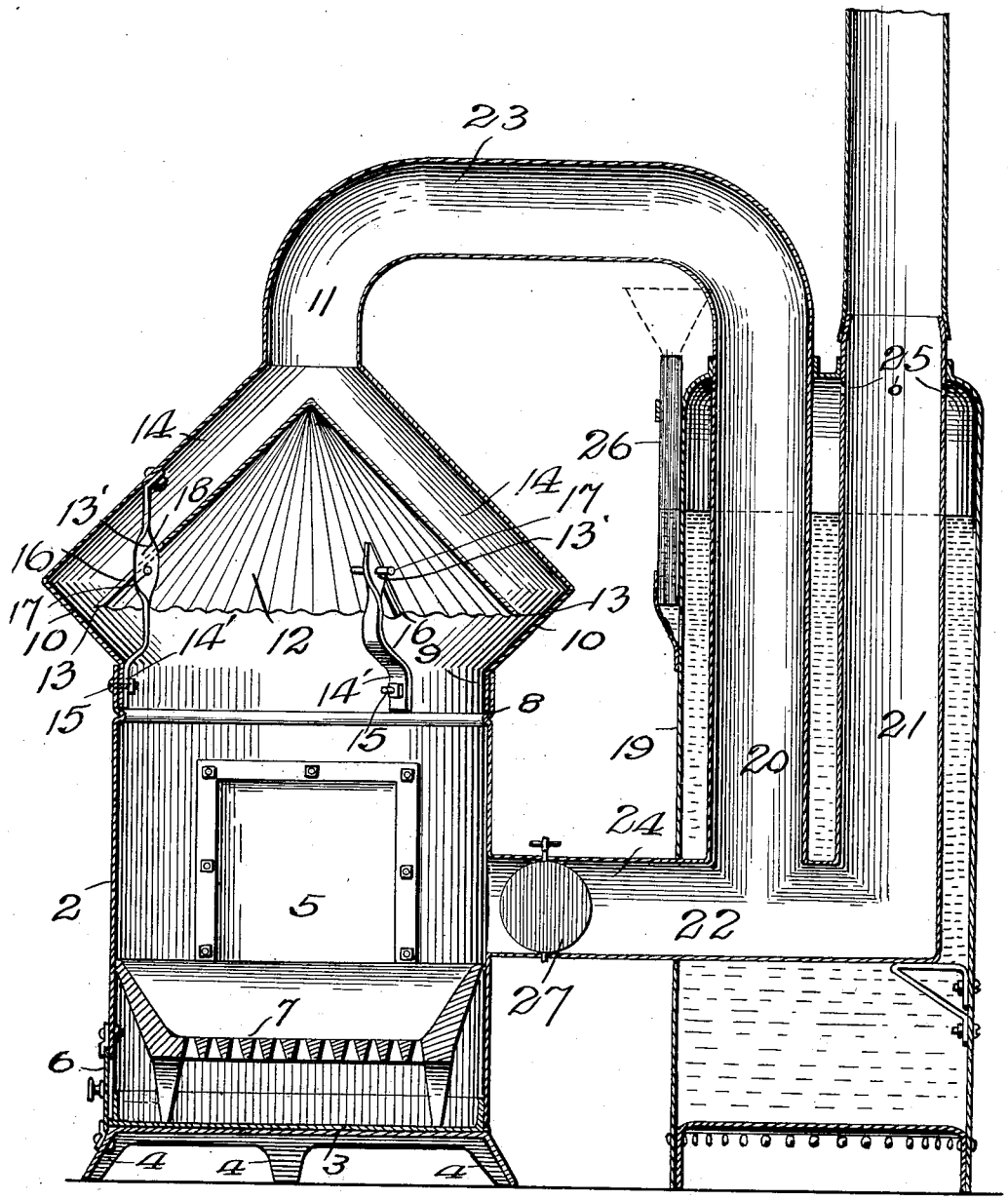

JOHNSTON MEALEY, OF HOWARD LAKE, MINNESOTA, ASSIGNOR OF ONE-HALF TO JOHN F. McDONALD, OF MINNEAPOLIS, MINNESOTA.

STOVE.

SPECIFICATION forming part of Letters Patent No. 628,342, dated July 4, 1899.

Application filed May 17, 1898. Serial No. 680,920. (No model.)

*To all whom it may concern:*

Be it known that I, JOHNSTON MEALEY, of Howard Lake, Wright county, State of Minnesota, have invented a certain new, useful, and Improved Stove, of which the following is a specification.

My invention relates to coal, wood, and straw burning stoves; and the object of the invention is to provide a cheap stove of large heating capacity.

The particular object of the invention is to provide a stove for all classes and one which will hold its heat and give off heat even after the fire has gone out.

The invention consists generally in a stove having a dome or heating-chamber in its upper part, with a cone or hood suspended therein and preventing the rapid passage of the products of combustion and heated air, which are retained and are distributed or thrown out to the outer walls of the stove and its dome or top, whereby the greater part of the heat from the fuel is radiated directly into the room.

The invention further consists in the combination, with a stove of the above description, of a water-tank through which the smoke pipes or flues lead before passing to the chimney, whereby quite a large body of water is heated to retain and give off its heat at night after the fire has burned low or gone out.

The invention further consists in various constructions and combinations of parts, all as hereinafter described, and particularly pointed out in the claims.

The invention will be more readily understood by reference to the accompanying drawing, which represents a vertical section of a heating-stove embodying my invention.

In the drawing, 2 represents the shell or casing of the stove. This is provided with sheet-metal bottom 3 and is supported by suitable legs 4. In one side of the stove-shell is a large feed-door 5, and in the lower part of the shell is an ash-door 6, which is preferably made in the form of a small slide.

7 represents a basket-grate which is set into the bottom of the shell and may be lifted therefrom when it is desired to burn wood or straw in the stove. In the upper part of the shell is a bead 8, upon which the flange 9 of the double cone 10 rests. This cone is of greater diameter than the shell 2, and the smoke-pipe 11 leads from the top and center of the cone directly above the fire in the lower part of the stove. To prevent the rapid passing off of the smoke and heated air from the fire, I provide the large hood or cone 12 within the double cone and having its lower edge 13 nearer to the lower walls of the double cone than to the upper walls thereof, so that quite a large heating-space 14 is left within the double cone or dome above the suspended cone 12. The cone 12 is preferably corrugated to insure strength and for the purpose of better dividing the currents of smoke and hot air that strike the same.

For supporting the cone 12 I provide three or more legs or straps 13', the lower ends 14' of which are secured by the bolts 15, that pass through the shell and the flange 9. The middle portions of the legs are twisted, so that the edge of the strap is presented to the cone. The cone is provided with narrow slots 16 to receive the thin straps 13', which prevent the turning of the cone, and the cone is supported by simple pins or bolts 17 in the straps and whereon the cone rests. The upper bends 18 of the strap prevent the lifting of the cone or the loosening thereof when the stove is being shipped.

19 represents a large water-tank, within which are the pipes 20 and 21 and the connecting-pipe 22. These pipes are carefully soldered and riveted and are of heavier material than the sections of the pipes 23 and 24 that are connected, respectively, to the pipes 20 and 22. The pipe 21 is provided with one or more holes 25 to permit the escape of any steam that may be generated in the top of the tank 19. The tank is provided with a large glass water-tube 26 on its side, and the upper end of this tube is open, so that the tank may be filled through the tube either by a hose connection or by employing a funnel in the upper end of the glass tube. At the same time the tube serves to show the height of the water in the tank.

27 represents a damper in the direct-draft pipe 24.

The operation of my improved stove is as follows: The fuel being laid upon the grate or upon the bottom of the stove and lighted, the smoke and heated air will rise into the upper part of the stove and will collect in the large cone 12, whereon the currents will impinge, and will be thrown downwardly toward the fire and produce as a first result the almost perfect combustion of the carbon in the smoke. The smoke, gases, and heated air which are thus retained or held in the stove will slowly flow out from beneath the corrugated lower edge of the cone and will be evenly distributed and thrown against the adjacent walls of the double cone or dome of the stove. Owing to the fact that the chamber above the cone 12 is larger than that immediately below it in the level cone, the progress of the products of combustion through the chamber 14 will be slow. A sufficient time will be allowed for the radiation of the heat therefrom. The location of the smoke-pipe connection 11 directly above the fire produces an even distribution of the hot currents of smoke and air in the chamber 14 as well as within the lower part or shell of the stove. The smoke that escapes into the smoke-pipe 23 passes downward through the pipe 20 and thence upward through the pipe 21 to heat the water in the tank 19, and the gases that pass out from the pipe 21 are quite thoroughly dampened, and all sparks that may be therein are dampened by the jet or jets of vapor that enter through the hole or holes 25 from the tank. As a large body of water is thus continuously heated during the time that fire is maintained in the stove, it is evident that this body of water will retain its heat after the fire in the stove has been extinguished, and the room or house containing the stove will be kept moderately warm thereafter by the heat from the tank-holder. When starting the fire, the direct-draft chamber 27 is opened to permit the passage of the smoke directly to the chimney-pipe connection 21.

This stove is remarkable for its heating capacity and its cheapness, which latter places the same within the reach of persons and families who cannot afford expensive stoves or furnaces. Obviously the chamber or double cone may be of any shape, and various modifications may be made in the construction of the stove as herein shown and described. I therefore do not confine the invention to the exact construction shown in the drawing.

Having thus described my invention, I claim as new and desire to secure by Letters Patent—

1. The combination, with the shell or body 2, of the dome 10 arranged thereon and in the form of a double cone and of greater diameter at its widest point than the diameter of said shell or body, a hood or cone 12 arranged within said double cone the lower edges of said hood being opposite the flaring walls of the lower portion of said double cone, and said hood being also of greater diameter at its base than said shell or body, a contracted annular opening being formed between the lower portion of said hood and the walls of said double cone, whereby the products of combustion and heated air rising from said shell will pass up into said hood and be slowly deflected down the inclined sides of the same and pass through said contracted opening, and an outlet provided in the upper part of said dome, substantially as described.

2. The combination, with a shell or body 2, of a dome 10 supported thereon, said dome being in the form of a double cone and of greater diameter at its widest point than the diameter of said shell, a smoke-outlet provided in the upper part of said dome, a cone or hood 12, legs or straps 13' having their ends secured to the walls of said dome and whereon said hood is supported, said hood having a corrugated surface and being of greater diameter at its lower edge than said shell and being suspended opposite the flaring walls of the lower portion of said dome whereby a narrow annular opening is formed between the lower portion of said cone and the walls of said dome so that the heated air and products of combustion that pass up into said cone will be slowly deflected down from the inclined walls of the same and will slowly pass through said opening to the smoke-pipe, substantially as described.

In testimony whereof I have hereunto set my hand, this 20th day of April, 1898, at Minneapolis, Minnesota.

JOHNSTON MEALEY.

Witnesses:
C. G. HAWLEY,
M. E. GOOLEY.